US012536981B2

(12) United States Patent
Beets et al.

(10) Patent No.: US 12,536,981 B2
(45) Date of Patent: Jan. 27, 2026

(54) APPARATUS FOR LENGTHENING THE VIBRATING LENGTH OF STRINGS ON A HARP

(71) Applicant: JORIS BEETS DESIGN LIMITED, London (GB)

(72) Inventors: Joris Willem Beets, London (GB); Olav Jens Hoekstra, Delft (NL)

(73) Assignee: JORIS BEETS DESIGN LIMITED, London (GB)

( * ) Notice: Subject to any disclaimer, the term of this patent is extended or adjusted under 35 U.S.C. 154(b) by 313 days.

(21) Appl. No.: 18/548,752

(22) PCT Filed: Feb. 24, 2022

(86) PCT No.: PCT/GB2022/000024
§ 371 (c)(1),
(2) Date: Sep. 1, 2023

(87) PCT Pub. No.: WO2022/185023
PCT Pub. Date: Sep. 9, 2022

(65) Prior Publication Data

US 2024/0161718 A1 May 16, 2024

(30) Foreign Application Priority Data

Mar. 4, 2021 (GB) ..................................... 2103096

(51) Int. Cl.
*G10D 3/147* (2020.01)
*G10D 1/04* (2020.01)

(52) U.S. Cl.
CPC ............... *G10D 3/147* (2020.02); *G10D 1/04* (2013.01)

(58) Field of Classification Search
CPC G10D 3/147; G10D 1/04; G10D 3/14; G10D 1/00
See application file for complete search history.

(56) References Cited

U.S. PATENT DOCUMENTS 4,936,182 A * 6/1990 Bunker .................... G10D 3/12 84/266
5,097,737 A 3/1992 Uhrig
(Continued)

FOREIGN PATENT DOCUMENTS

CN 205900077 U 1/2017

OTHER PUBLICATIONS

International Search Report and Written Opinion received for PCT Patent Application No. PCT/GB2022/000024, dated May 16, 2022, 12 pages.

*Primary Examiner* — Kimberly R Lockett
(74) *Attorney, Agent, or Firm* — AEON Law, PLLC; Adam L.K. Philipp; Charlotte E. Holoubek

(57) ABSTRACT

Apparatus (32) for lengthening the vibrating length of strings (34) on a harp, which apparatus (32) comprises: (i) securing means (42) for securing one end of the strings (34); (ii) adjuster members (46) for increasing the length of the strings (34) in order to increase the tension in the strings and thereby alter the frequency of vibration of the strings (34); and (iii) mounting means (48) for mounting the apparatus (32) on the harp (36) and wherein: (iv) there is one of the adjuster members (46) for each one of the strings (34); and (v) the adjuster members (46) are pivotable adjuster members (46) which are pivotable between a string non-lengthening position and a string lengthening position.

10 Claims, 12 Drawing Sheets

(56) References Cited

U.S. PATENT DOCUMENTS

| | | | |
|---|---|---|---|
| 7,534,954 | B1 | 5/2009 | Cassista |
| 7,935,876 | B1 | 5/2011 | West |
| 9,520,110 | B1 | 12/2016 | Handzic et al. |
| 2011/0011238 | A1 | 1/2011 | Toone |

* cited by examiner

APPARATUS FOR LENGTHENING THE VIBRATING LENGTH OF STRINGS ON A HARP

RELATED APPLICATIONS

This application is a national phase entry of PCT International Patent Application No. PCT/GB2022/000024, filed Feb. 24, 2022, in the name of "JORIS BEETS DESIGN LIMITED" [UK], which PCT application claims the benefit of priority of Great Britain Patent Application Serial No. 2103096.0, filed Mar. 4, 2021, in the name of "JORIS BEETS DESIGN LIMITED" [UK]. The entire contents of the above-referenced applications and of all priority documents referenced in the Application Data Sheet filed herewith are hereby incorporated by reference for all purposes.

This invention relates to musical instruments and, more especially, this invention relates to harps.

Harps are well known musical instruments. A harp comprises a body, a neck, a post and strings. One end of the neck is connected to an upper part of the body. The other end of the neck is connected to an upper part of the post. The post is connected at its lower end to the body. The body forms a long case having a top known as a soundboard. The strings are attached at one end to the neck. The strings are attached at their other end to the body, typically via a strip member. The neck of the harp has a plurality of tuning pins. The strings are attached to these tuning pins. During playing of a harp, the strings are plucked to cause the strings to vibrate at different frequencies. The vibrations are transferred to the body which acts as a soundboard to provide the required tone from each of the strings. The frequency of vibration of the strings of given material properties varies with the vibrating length and tension of the strings. U.S. Pat. No. 4,936,182 discloses that there are a number of known devices for altering the frequency of vibration of the strings. As disclosed in the USA patent, the known devices operate by shortening the vibrating length of the strings and they have various disadvantages. It is an aim of the present invention to provide apparatus which reduces the disadvantages of the known different types of apparatus.

Accordingly, in one non-limiting embodiment of the present invention there is provided apparatus for lengthening the vibrating length of strings on a harp, which apparatus comprises;

(i) securing means for securing one end of the strings;

(ii) adjuster members for increasing the length of the strings in order to increase the tension in the strings and thereby alter the frequency of vibration of the strings; and (iii) mounting means for mounting the apparatus on the harp, and wherein;

(iv) there is one of the adjuster members for each one of the strings; and (v) the adjuster members are pivotable adjuster members which are pivotable between a string non-lengthening position and a string lengthening position.

The apparatus of the present invention operates by lengthening the length of strings on a harp, as compared to the known apparatus which operates by shortening the vibrating length of strings on a harp. With the apparatus of the present invention, the lengthening is effected by stretching the strings. The degree of lengthening is small and is that required to increase the tension in the strings and thereby increase the frequency of a musical note that is able to be played by the strings.

The apparatus may be one in which, in use, the string non-lengthening position is one in which the string vibrates at non-adjusted frequency on the harp, and in which the string lengthening position is one in which the string is increased in length to increase tension in the string and thereby increase the frequency of a musical note that is able to be played by the string.

The apparatus may be one in which the adjuster members act on the securing means in order to increase the length of the strings. The adjuster members may operate in other ways if desired.

The apparatus may be one in which the securing means comprises a plurality of finger members, in which there is one of the finger members for each one of the strings, and in each one of finger members is operated by one of the adjuster members. Securing means other than finger members may be employed.

The apparatus may be one in which the securing means comprises a plurality of securing locations, and in which there is one of the securing locations for each one of the strings. The securing locations are preferably holes. Other types of securing locations may be employed.

Preferably, the apparatus is one in which the securing locations are all in a straight line, and in which the adjuster members are of different shapes, with the different shapes increasing the length of the strings by different amounts. The securing means is preferably a securing plate. Securing means other than a securing plate may be employed.

The adjuster members are preferably lever members. Other types of adjuster members may be employed.

When the adjuster members are lever members, then the apparatus may be one in which each one of the lever members has a cam portion which operates on the securing means.

The apparatus may include a rod member, and in which the adjuster members are pivotally mounted on the rod member. Each one of the adjuster members may have a receiving slot for receiving the rod member. The adjuster members may be pivotably mounted by pivot means other than the rod member.

The mounting means may comprise a pair of apertured lugs arranged one at each end of the apparatus. Other types of mounting means may be employed. When the mounting means is the pair of apertured lugs, then there may be one aperture in each lug. More than one aperture in each lug may be employed.

Preferably, when the securing means is a securing plate, then the lugs are formed as an integral part of the securing plate. Thus the securing means and the lugs are able to be formed as a single plate member which facilitates making the apparatus in a simple and cost-effective manner.

The apparatus may include fine tuning means. The apparatus may be one in which the fine tuning means is a screw which in use is located in a frame of the harp, and which has a head for abutting against the adjuster means. The screw is able to be screwed in or out in order to provide the fine tuning of the adjuster means. Other types of fine tuning means may be employed.

The present invention also extends to a harp when provided with the apparatus of the present invention.

Embodiments of the invention will now be described solely by way of example and with reference to the accompanying drawings in which:

FIG. 1 is a view of a harp as disclosed in U.S. Pat. No. 4,936,182;

Figure 2:
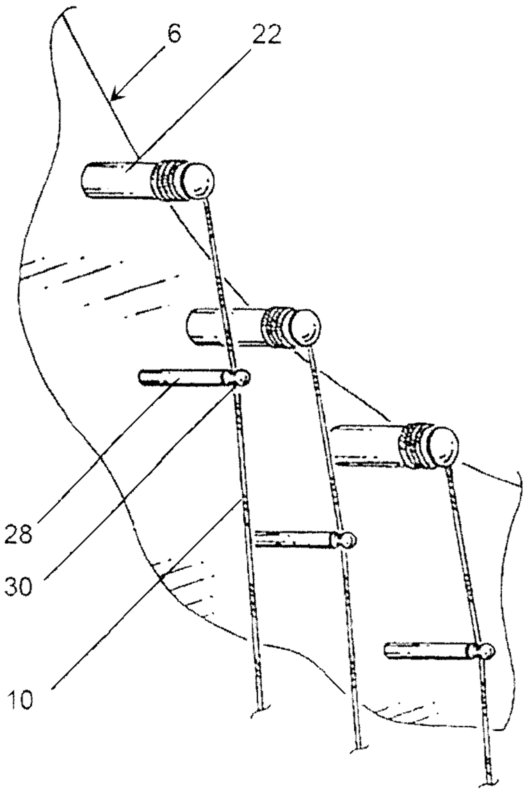
FIG. 2 is an enlarged view of a neck of the harp as shown in FIG. 1.
Figure 1:
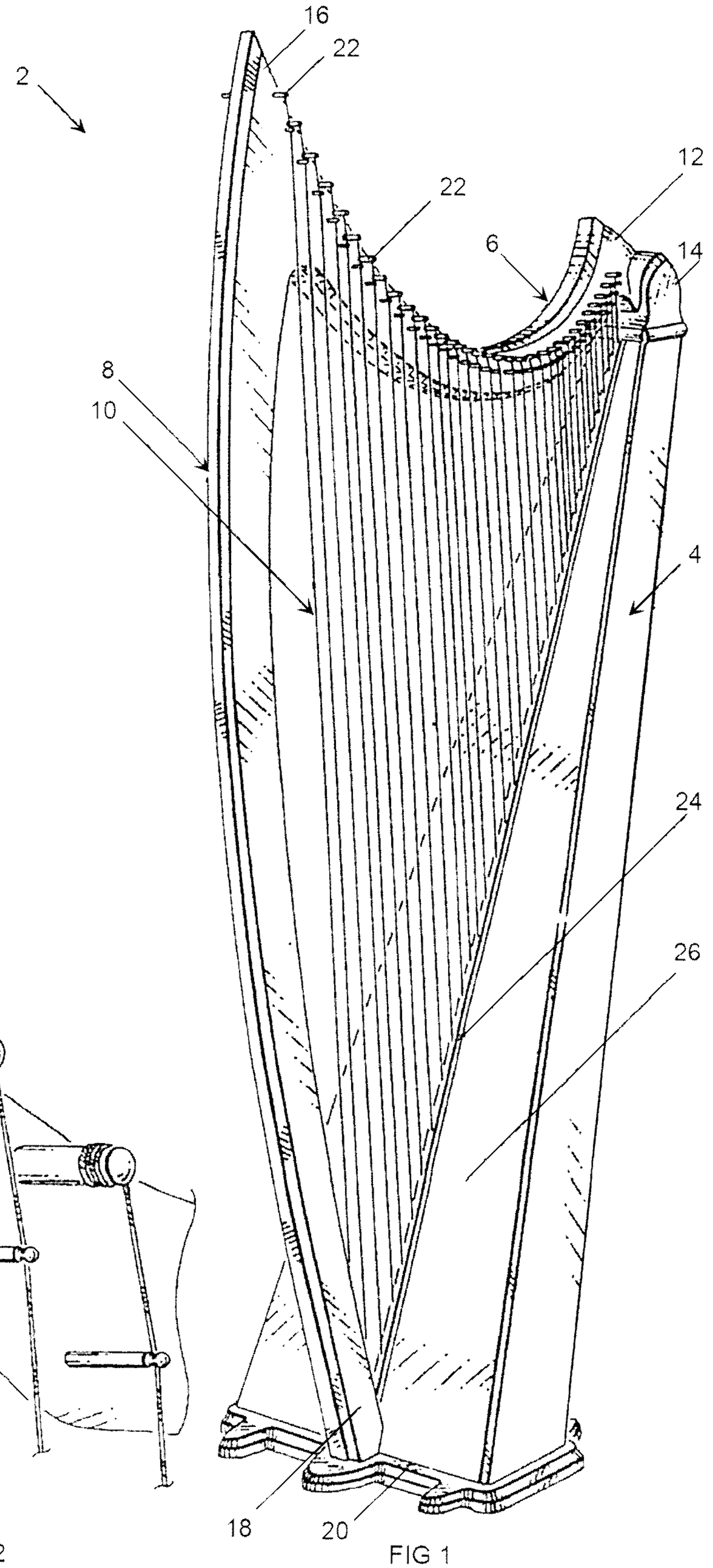

Referring to FIGS. 1 and 2, there is shown a harp 2 as disclosed in U.S. Pat. No. 4,936,182. The harp 2 has a body 4, a neck 6, a post 8 and strings 10. The neck 6 is connected at one end 12 to the upper end 14 of the body 4. The other end 16 of the neck 6 is connected to the post 8 as shown. The post 8 has a lower end 18 which is connected to the lower end 20 of the body 4. The strings 10 are connected at their upper ends to tuning pins 22. The strings 10 are connected at their lower ends to a strip member 24 which is in turn connected to the face 26 of the body 4 as shown.

As shown in FIG. 2, the neck 6 is provided with bridge pins 28. There is one bridge pin 28 for each tuning pin 22. Each bridge pin 28 has a tapered groove 30 which receives the string 10 and thereby precisely defines the vibrating length of the string 10. The apparatus shown in the USA Patent operates by shortening the vibrating length of the strings 10 on the harp 2. The apparatus is mounted directly below the bridge pins 28 for each of the strings 10.

Referring now to FIGS. 3-9, there is shown first apparatus 32 of the present invention. The apparatus 32 is for adjusting the tension in harp strings 34 on the harp 36. The apparatus 32 operates by increasing the total length of the strings 34 and thereby increasing the tension in the strings 34 which increases the frequency at which the strings 34 vibrate. Thus the apparatus 32 is for increasing the length of the strings 34, rather than reducing the vibrating length of the strings 10 as disclosed in the USA patent. In the apparatus 32, the vibrating length of the strings 34 is kept constant by a rod member 62. For ease of illustration, only one string 34 has been shown and only harp frame parts 38, 40 have been shown.

The apparatus 32 comprises securing means 42 for securing one end 44 of the strings 34. The apparatus 32 also comprises adjuster members 46 for increasing the length of the strings 34 in order to alter the frequency of vibration of the strings 34. The apparatus 32 still further comprises mounting means 48 for mounting the apparatus 32 on the harp 36.

Figure 5:
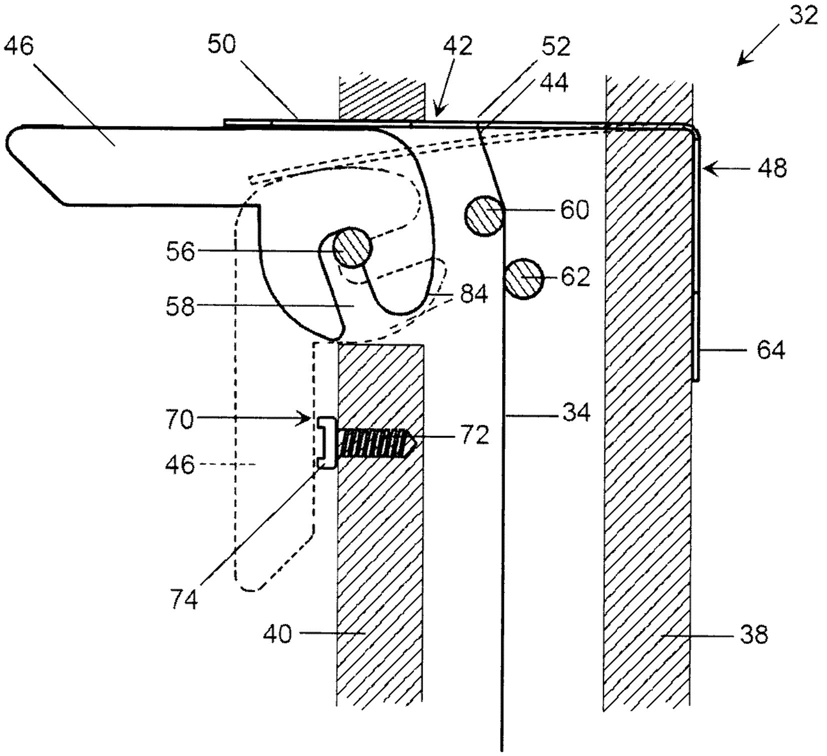
FIG. 5 is a partial cross section through the apparatus shown in FIG. 3 and shows an adjuster member in a sharp position.
Figure 6:
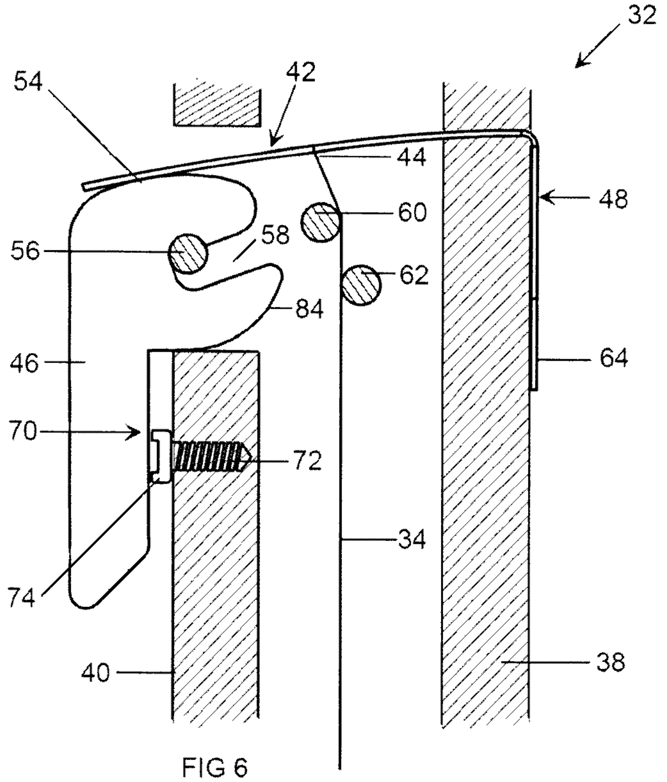
FIG. 6 is a cross section like FIG. 5 but shows the adjuster member in a neutral position.

There is one of the adjuster members 46 for each one of the strings 34. The adjuster members 46 are pivotable adjuster members 46 which are pivotable between a string non-lengthening position which is shown in FIG. 6, and a string lengthening position which is shown in FIGS. 5 and 6. The lengthening of the strings 34 is effected by rotating the adjuster members 46 in order to increase the tension in the strings 34, and thereby to increase the frequency of a musical note that is able to be played by the strings 34. The adjuster members 46 act on the securing means 42 for increasing the length of the strings 34.

The securing means 42 comprises a plurality of finger members 50. There is one of the finger members 50 for each one of the strings 34. Each one of the finger members 50 is operated by one of the adjuster members 46. The securing means 42 comprises a plurality of securing locations 52 for the strings 34. There is one of the securing locations 52 for each one of the strings 34. The securing locations 52 are at varying distances from the mounting means 48 as can be appreciated from FIG. 4. The distance of each securing location 52 from the mounting means 48 determines the amount of lengthening of the string 34 and thereby the change in frequency of the string 34 and the change in the musical note that is able to be obtained from the string 34. As can also be appreciated from FIG. 4, the securing locations 52 are in the form of holes.

The securing means 42 is in the form of a securing plate. The adjuster members 46 are in the form of lever members. Each one of the lever members has a cam portion 54 which operates on the securing means 42.

Figure 7:
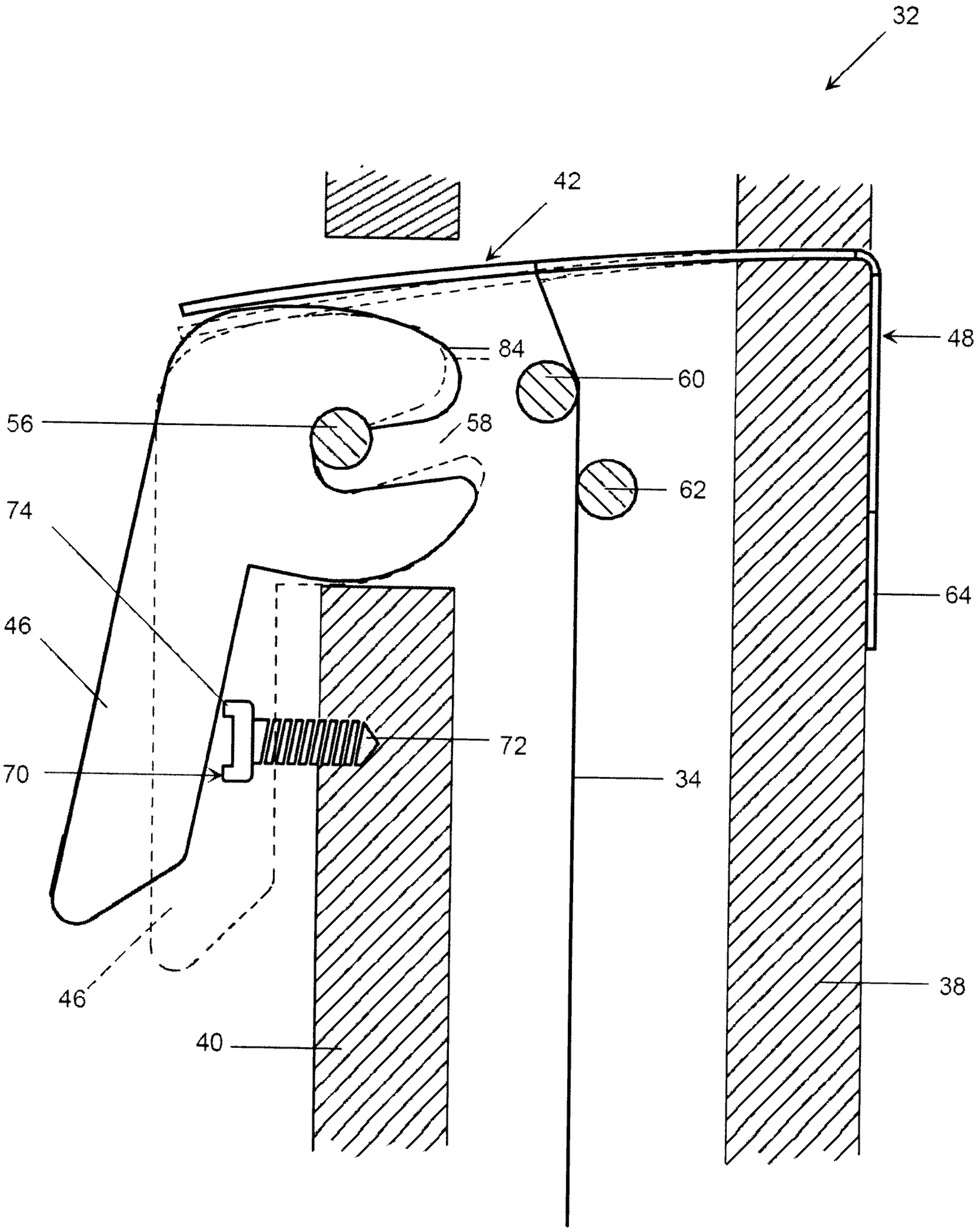
FIG. 7 is an enlarged cross sectional view like FIG. 5 but from the other side and showing the adjuster member in an intermediate position between the positions shown in FIGS. 5 and 6.
Figure 8:
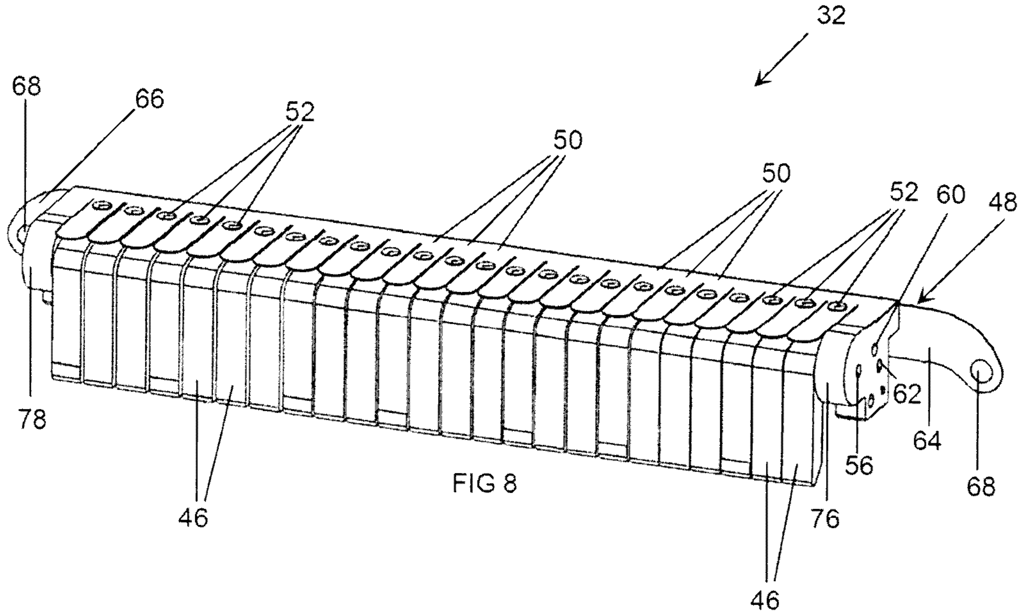
FIG. 8 is a perspective view like FIG. 3 but taken from a slightly different angle.
Figure 9:
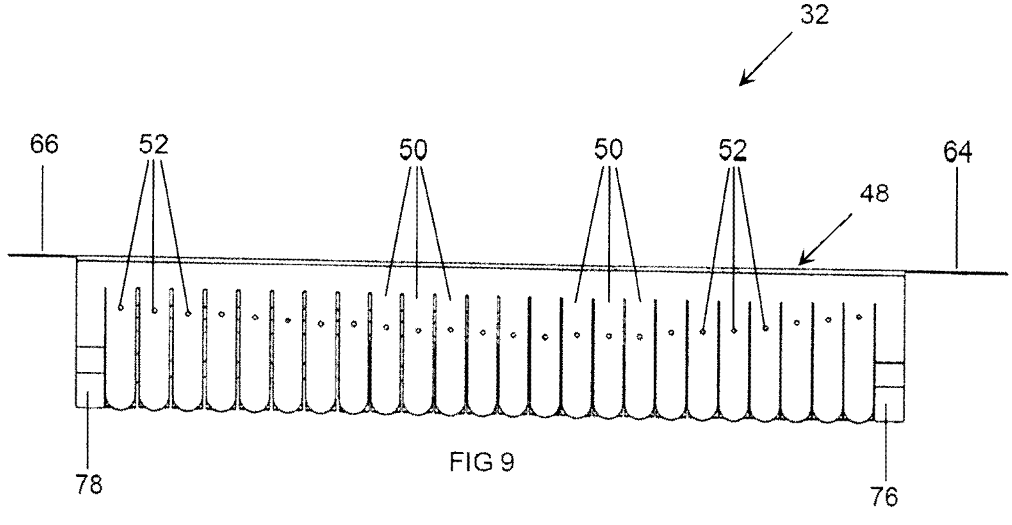
FIG. 9 is a top view like FIG. 4 but omits the parts of a harp which are shown in FIG. 4.
Figure 13:
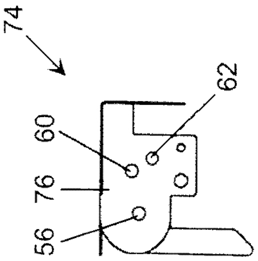
FIG. 13 is an end view of the apparatus as shown in FIG. 11.
Figure 10:
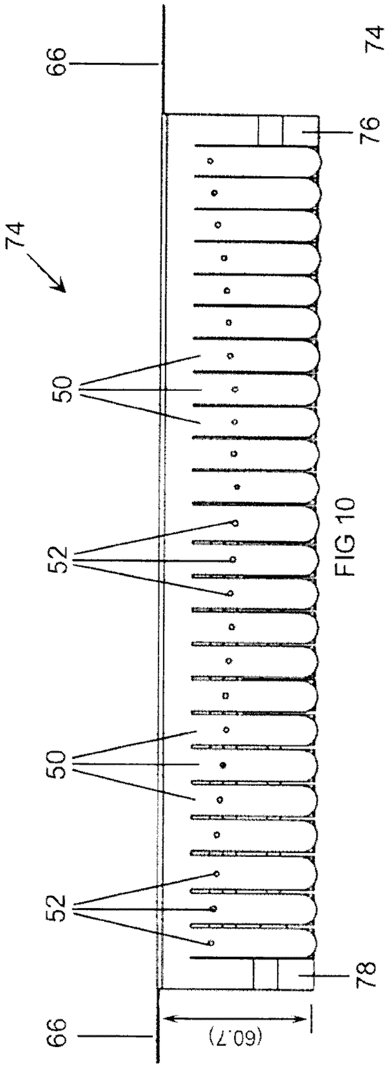
FIG. 10 is a top view like FIG. 9 but of second apparatus of the present invention and one which has the illustrated measurements.
Figure 11:
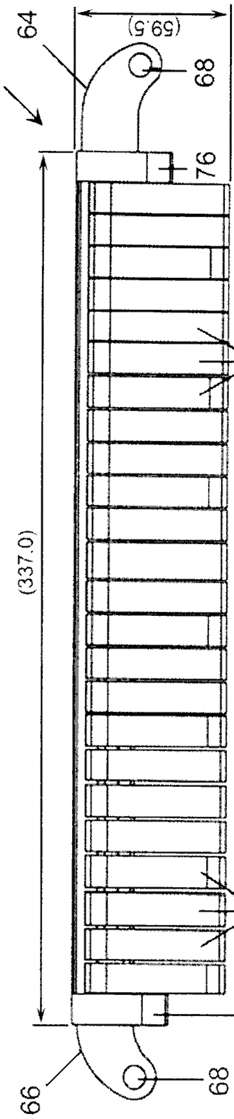
FIG. 11 is a front view of the apparatus as shown in FIG. 10 and has the illustrated measurements.
Figure 12:
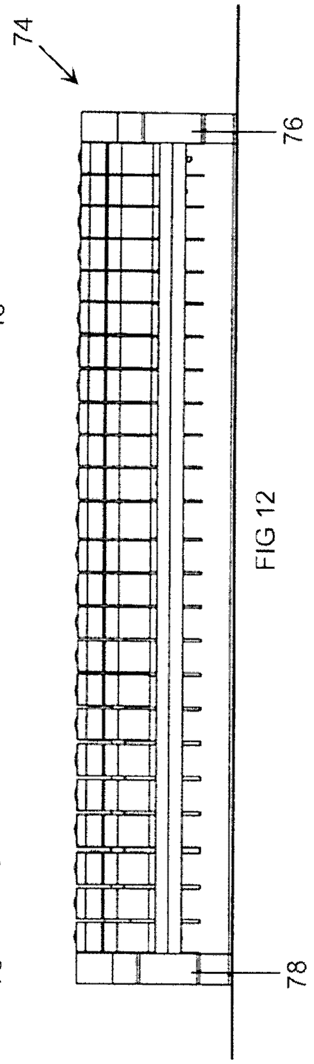
FIG. 12 is a rear view of part of the apparatus as shown in FIG. 11.
Figure 14:
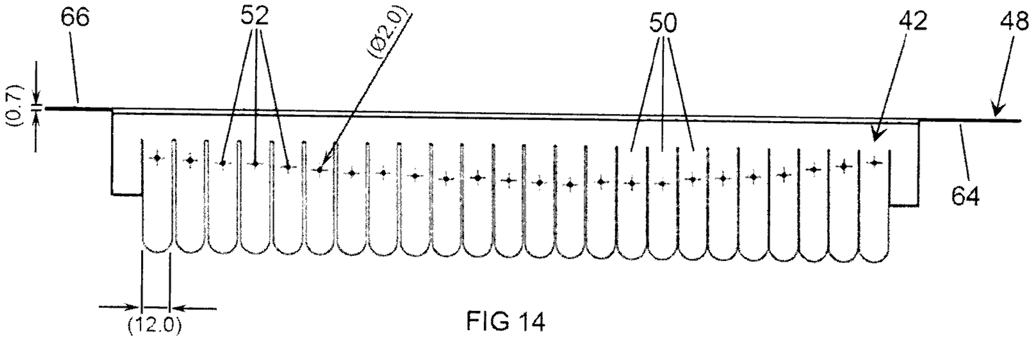
FIG. 14 is a top view of a securing means forming part of the apparatus as shown in FIG. 10 and having the measurements shown.
Figure 15:
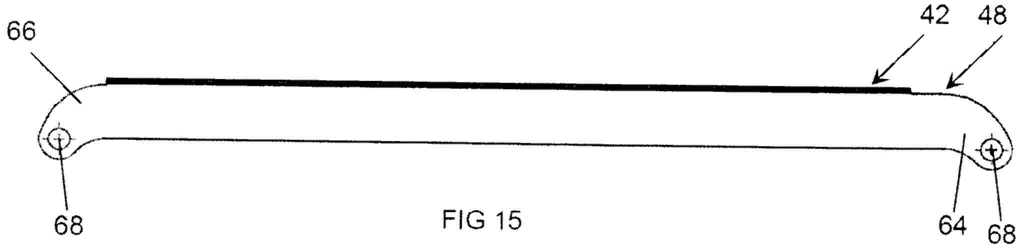
FIG. 15 is a front view of the securing means shown in FIG. 14.
Figure 16:
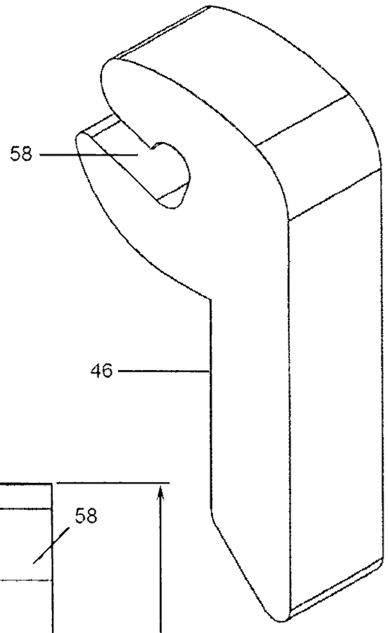
FIG. 16 is a perspective view of an adjuster member forming part of the apparatus as shown in FIGS. 10-12.
Figure 17:
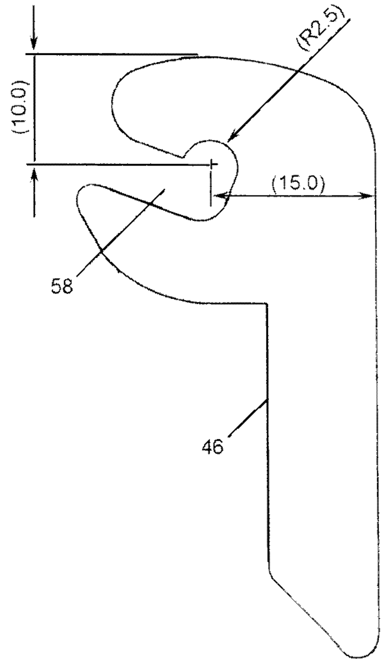
FIG. 17 is a side view of adjuster member shown in FIG. 16 and having the stated measurements.
Figure 18:
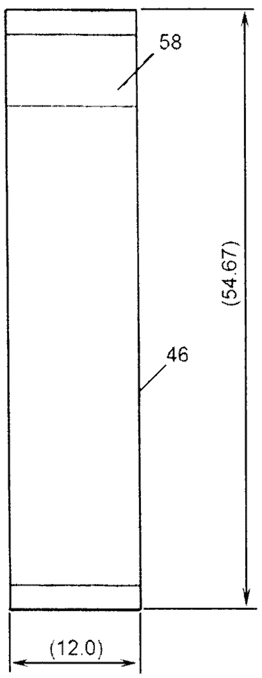
FIG. 18 is a view looking from right to left of the adjuster member as shown in FIGS. 16 and 17 and having the stated measurements.

The apparatus 32 includes a rod member 56. The adjuster members 46 are pivotably mounted on the rod member 56 as shown in FIGS. 5, 6 and 7. Each one of the adjuster members 46 has a receiving slot 58 for receiving the rod member 56.

Figure 3:
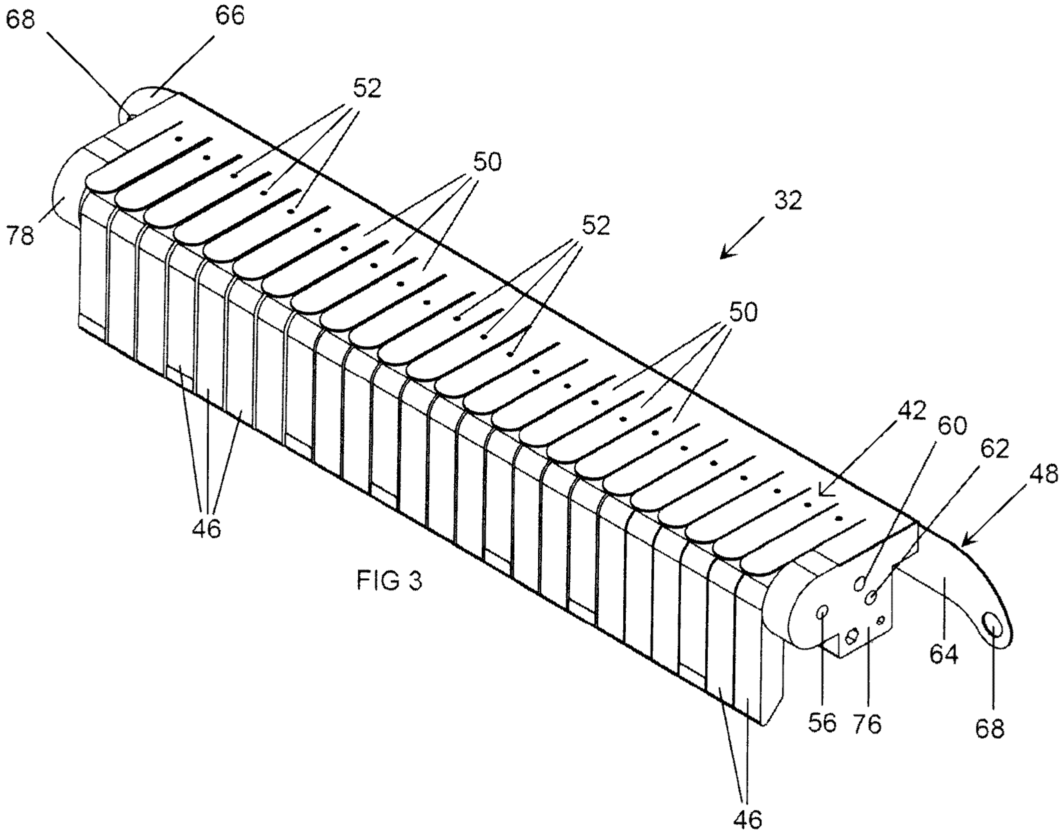
FIG. 3 is a view from the front, above and one side of first apparatus of the present invention for lengthening the vibrating length of strings on a harp.
Figure 4:
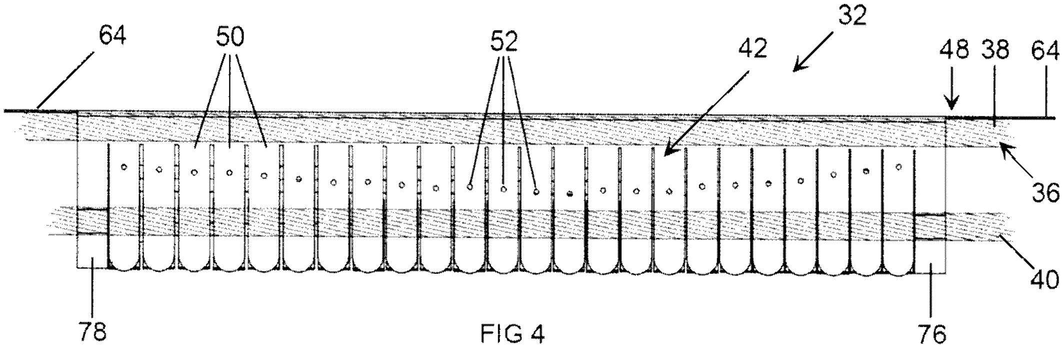
FIG. 4 is a top view of the apparatus as shown in FIG. 3.

The apparatus 32 includes a rod member 60 which acts a guide for causing the strings 34 precisely to engage the rod member 62 and thereby define exactly the vibrating length of the strings 34. This overall physical length of the strings 34 is then only increased, for example by 1-3 mm, when it is required to increase the tension in the strings 34 and thereby alter the frequency of vibration of the strings 34. As shown in FIGS. 5-7, there is one of the rod members 60, 62 positioned on either side of the strings 34. The mounting means comprises a pair of apertured lugs 64, 66. The apertured lugs 64, 66 are arranged one at each end of the apparatus 32 as shown in FIGS. 3 and 4. There is one aperture 68 in each of the lugs 64, 66. The lugs 64, 66 are formed as an integral part of the securing means 42 which is in the form of the securing plate.

The apparatus 32 includes fine tuning means 70. The fine tuning means 70 is in the form of a screw having a threaded shank 72 which screws into the frame part 40 as shown in FIG. 7. The fine tuning means 70 also has a head 74 which abuts against the adjuster means 46 as shown in FIG. 6 in order to provide fine tuning of the adjuster means 46. This fine tuning is able to be achieved by screwing the fine tuning means 70 into or out of the frame part 40.

The strings 34 are able to be connected at their ends 44 via the securing locations 52 by any suitable and appropriate fastener means. FIGS. 5, 6 and 7 show how the securing means 42 in the form of the plate is able to be secured to the frame part 38 via the mounting means 48 and the lugs 64, 66. As can be appreciated from FIGS. 5, 6 and 7, when the adjuster members 46 are pushed upwardly, they push the securing means 42 upwardly, and this in turn stretches the strings 34. FIG. 5 shows the illustrated adjuster member 46 in a sharp position. FIG. 6 shows the adjuster member 46 in a neutral position. The neutral position is also shown in FIG. 5 in broken lines. FIG. 7 shows the neutral position 46 in broken lines. FIG. 7 also shows the adjuster member 46 in a position between the position shown in FIG. 5 and the position shown in FIG. 6, The adjuster members 46 are able to give precision adjustment of their strings 34. The amount of tension to be increased can be fine tuned by the fine tuning means 70, for example to give a precise semi-tone increase after installation of the apparatus 32 on the harp 36.

In order to facilitate manufacture of the apparatus 32 at an optimum low cost, the adjuster members 46 are the same for every string 34. The distance from the securing locations 52 to the frame part 38 determines the amount of tension increase to the strings 36 and this is different for each string 36. The mounting means 48 in the form of the sheet metal plate is attached to the frame part 38 on its side as shown.

FIGS. 10-13 shown second apparatus 74 of the present invention. The apparatus 74 is basically the same as the apparatus 32 except that the apparatus 74 has been shown with specific size dimensions which are given in millimeters. Similar parts as in the apparatus 32 have been given the same reference numerals for ease of comparison and understanding.

In both the apparatus 32 and the apparatus 74, it will be seen that the rod members 56, 60 and 62 extend between, and are mounted on, end members 76, 78.

Referring now to FIGS. 19-23 there is shown third apparatus 80 of the present invention. Similar parts as in the apparatus 32 have been given the same reference numerals for ease of comparison and understanding.

In the apparatus 80, it will be seen that the rod members 60, 62 from the apparatus 32, 74 have been omitted. This can best be appreciated from a comparison of FIGS. 21 and 22 with FIGS. 5 and 6. Also from a comparison of FIGS. 21 and 22 with FIGS. 5 and 6, it will be seen that the adjuster members 46 still pivot about the rod member 56 but the adjuster members 46 do not have the receiving slots 58. The adjuster members 46 in the apparatus 80 have different shapes. More specifically the adjuster members 46 have different cam profiles 82. This compares to the single cam profile 84 in the apparatus 32. Because the cam profiles 82 are different to each other, they are able to increase the length of the strings 34 by different amounts, and thereby alter the frequency or vibration of the strings 34 by different amounts.

Figure 19:
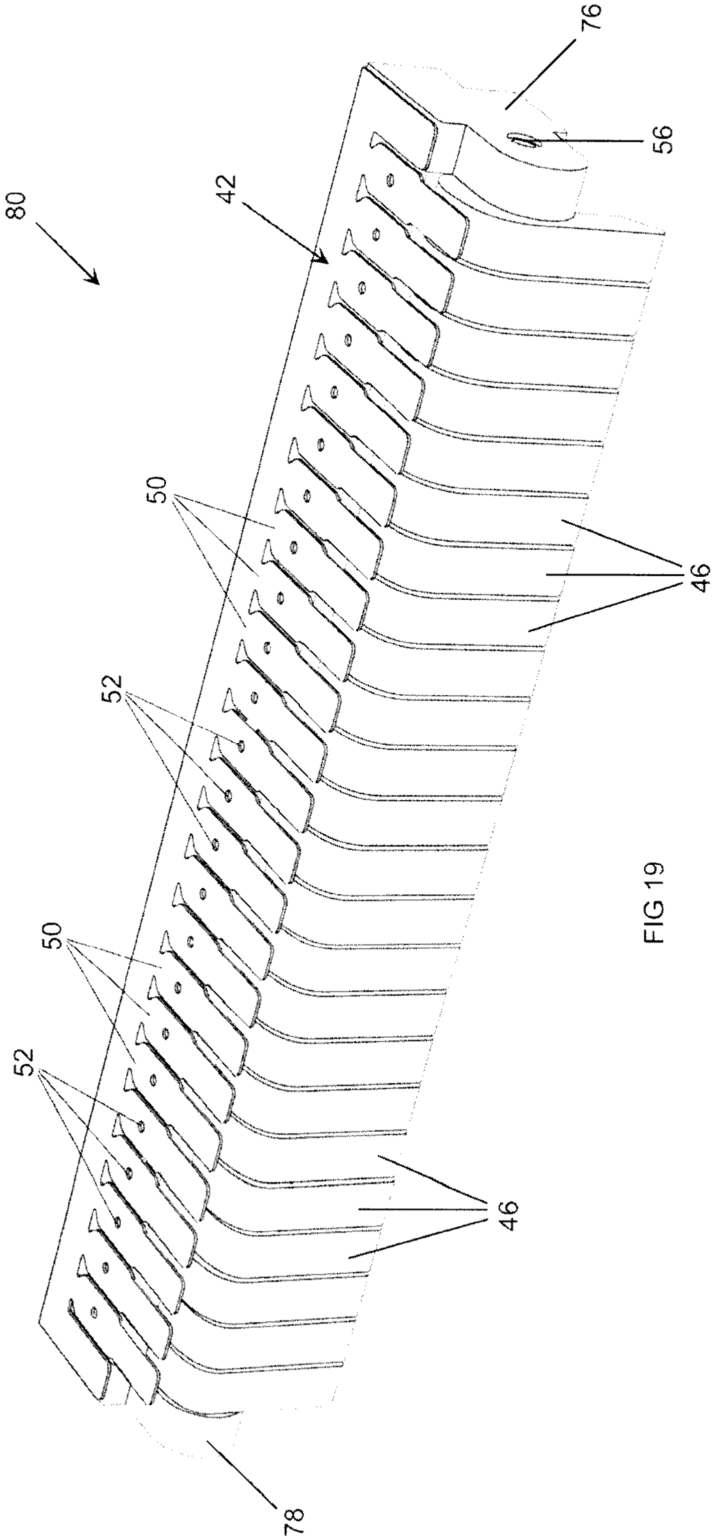
FIG. 19 is a view like FIG. 3 but shows third apparatus of the present invention.
Figure 20:
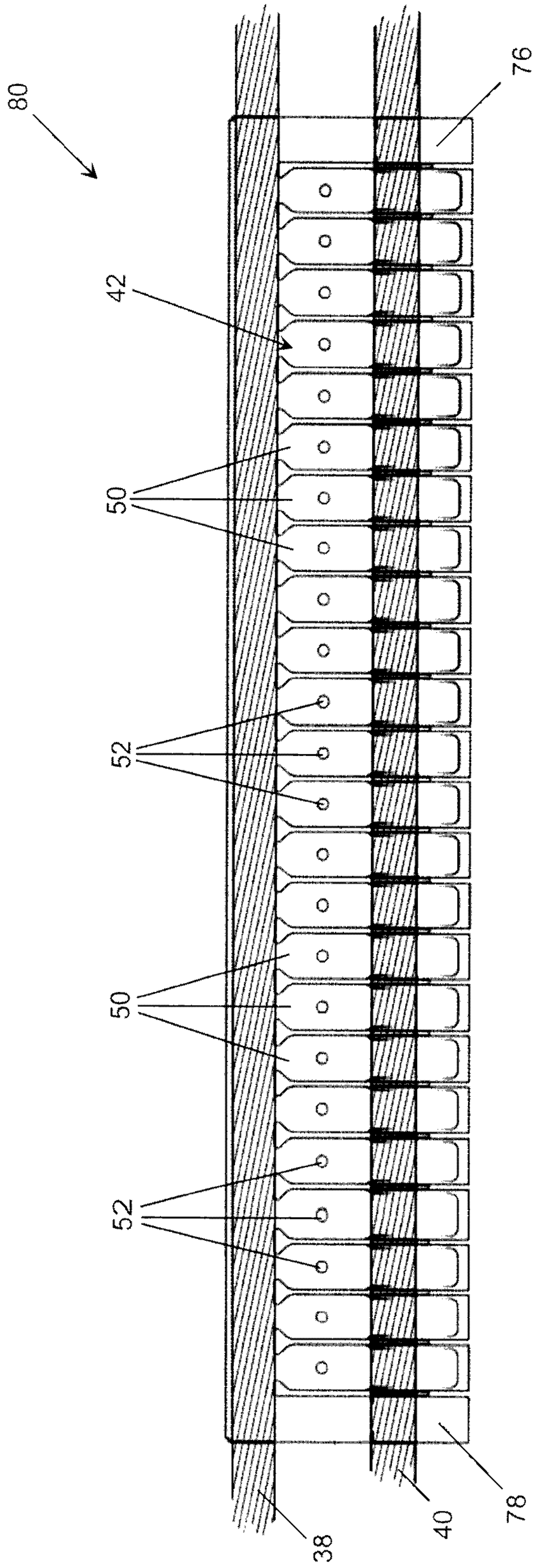
FIG. 20 is a top view like FIG. 4 but of the apparatus as shown in FIG. 19.
Figure 21:
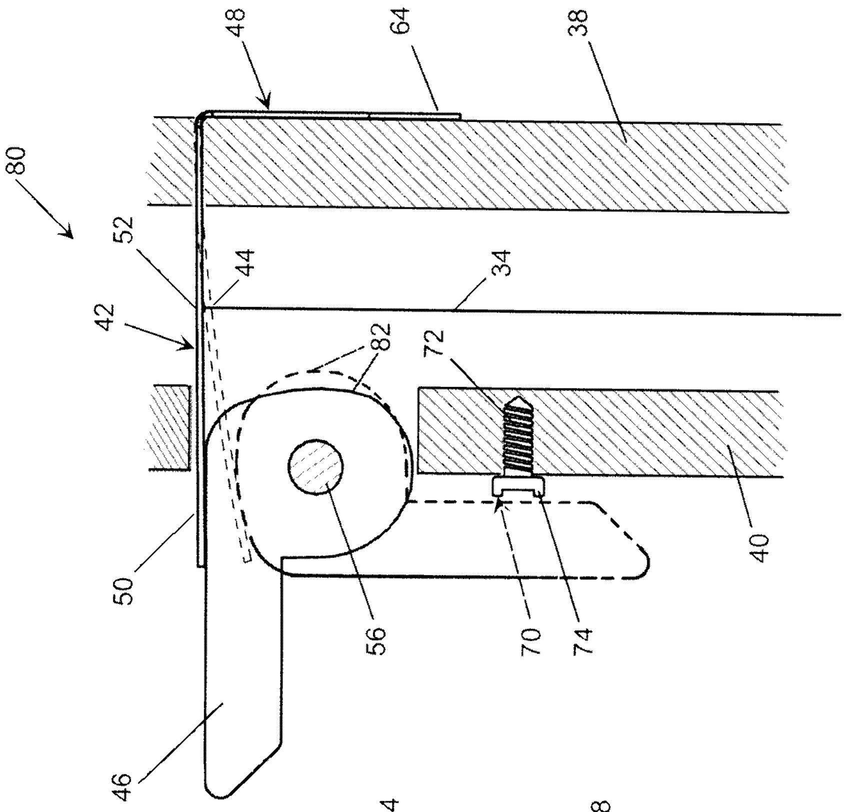
FIG. 21 is a partial cross section like FIG. 5 but through the apparatus shown in FIG. 19 and shows an adjuster member in a sharp position.
Figure 22:
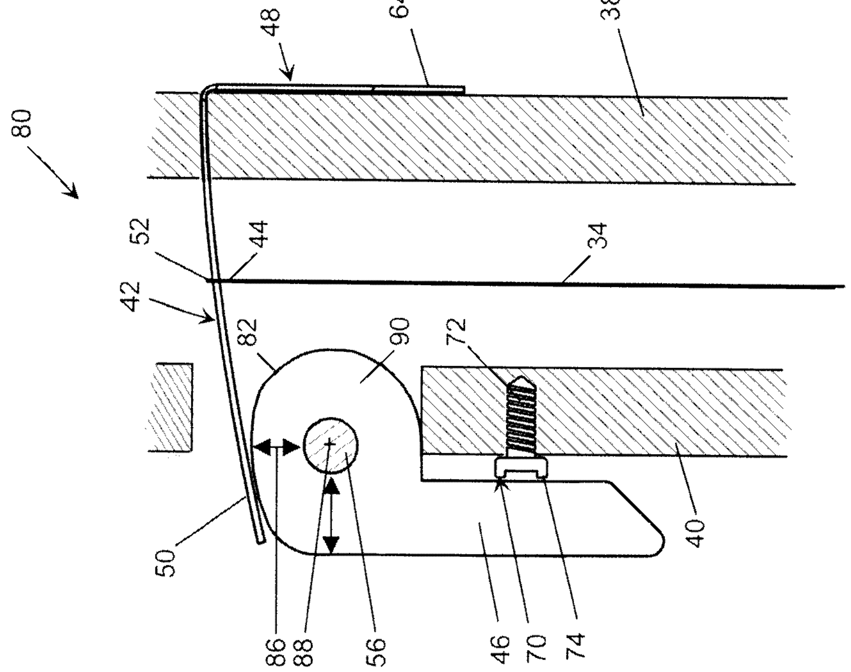
FIG. 22 is a cross section like FIG. 6 but shows the adjuster member in a neutral position.
Figure 23:
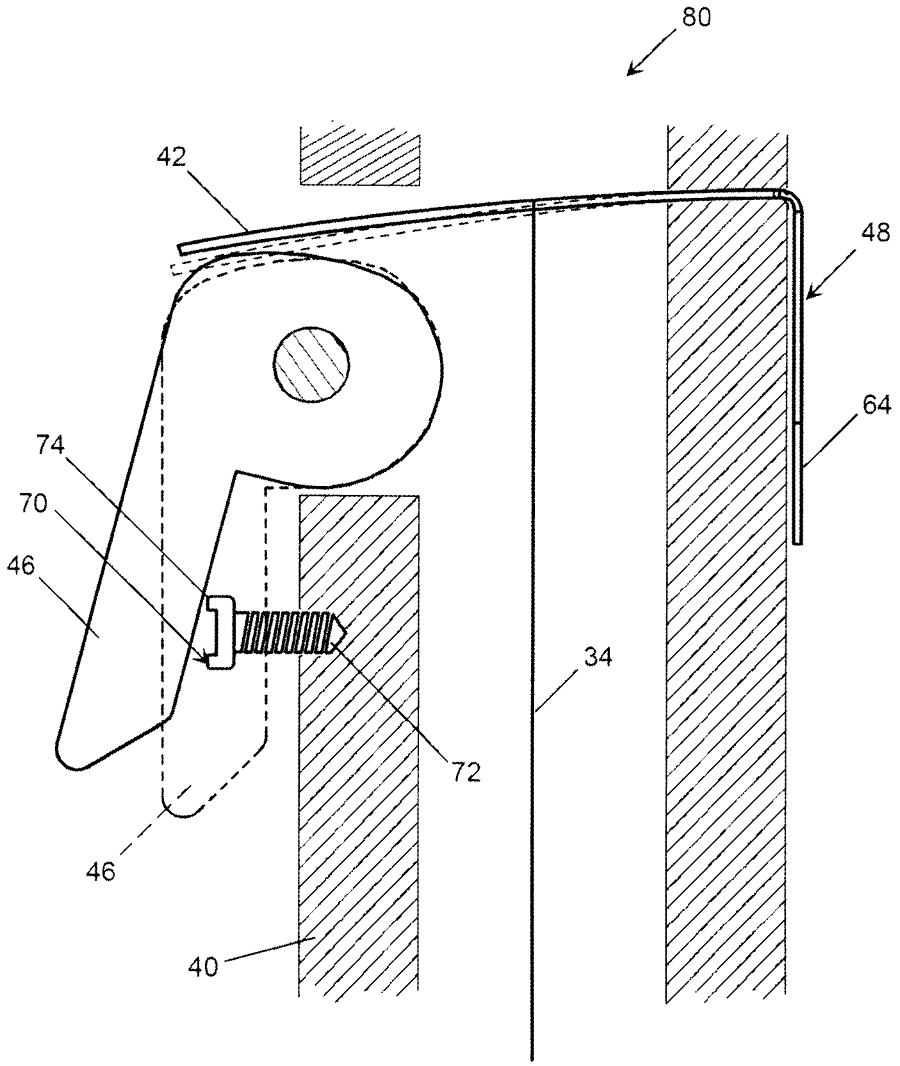
FIG. 23 is an enlarged cross sectional view like FIG. 21 but shows the adjuster member in an intermediate position between the positions shown in FIGS. 21 and 22.

From a comparison of FIG. 19 with FIG. 3, it will be seen that in the apparatus 80, the securing locations 52 are in a straight line. This compares with the curved line for the securing locations 52 in the apparatus 32. In the apparatus 80, the finger members 50 are still sprung finger members 50. Referring to FIG. 22, in use of the apparatus 80, the distance 86 from the centre 88 of the cam head 90 of each adjuster member 46 to the top of the cam profile 82 where it touches the finger member 50 determines the amount of length increase and therefore tension increase for each string 34. This distance is different for each string 34 and this different distance causes the strings 34 to vibrate at different required frequencies in order to obtain the different required tones from each of the strings 34. Increasing the tension in a string 34 increases the frequency of the musical note that is produced. As in the apparatus 32, 74, 80 the amount of tension for each string 34 is able to be fine-tuned by the fine tuning means 70. From a comparison of FIGS. 19 and 20 with FIGS. 3 and 4, it will be seen that in the apparatus 80, the shape of the finger members 50 as viewed from above is different from the shape of the finger members 50 as viewed from above in the apparatus 32. The finger members 50 may be of other shapes.

The apparatus 32, 74, 80 of the present invention may be used to allow the frequency of individual strings 34 to increase by one or two semitones. The apparatus 32, 74, 80 operates by stretching the strings 34 instead of shortening the vibrating length. Stretching the strings increases the tension and therefore the pitch. The apparatus 32, 74, 80 provides the possibility of three pitches per string, i.e. flat, neutral and sharp. The apparatus 32, 74, 80 may be produced at a decreased cost compared with known apparatus which shortens the vibrating length of the strings. This cost reduction may be achieved by a decrease in the amounts of parts required for the apparatus of the present invention, and also in the ability to standardize some of the component parts. The apparatus 32, 74, 80 is easily adjusted by the fine tuning means 70. The apparatus 32, 74, 80 is able to be robust in use and provide better fall protection because the adjuster means 46 in the form of the levered cams do not stick out in the neutral position shown in FIG. 6.

The apparatus of the present invention allows for the strings to be centrally placed in the harp, supported equally at both sides. This may provide structural advantages, for example the absence of a resulting torque on the frame as in the non-central known apparatus, which in turn means lower material property requirements for the overall harp frame and thereby may reduce cost. Also, the strings are not mechanically pressed at one point repeatedly to shorten the vibrating length, which may result in longer string life.

The apparatus of the present invention may be produced as an inexpensive low threshold apparatus for entry level use of an electric harp, for example for children. Apparatus for changing the vibrating length of strings on a harp typically forms a major component cost part for the harp. The ability of the apparatus of the present invention to reduce this cost is a major advantage. A further advantage is the ability to change the tension in the strings as a primary mechanism for instantly shifting the pitch by semitones.

It is to be appreciated that the embodiments of the invention described above with reference to the accompanying drawings have been given by way of example only and that modifications may be effected. Thus, for example, other types of securing means 42 adjuster members 46 and mounting means 48 may be employed. The strings of the harp may stretch to any suitable lengths. The stretching of the strings may depend upon their length, material properties and diameter. The strings of the harp may be made of any suitable materials including nylon, carbon fiber reinforced nylon, sheep gut and metals. The apparatus may be used on different types of harp. Individual components shown in the drawings are not limited to use in their drawings and they may be used in other drawings and in all aspects of the invention. The invention also extends to the individual components mentioned and/or shown above, taken singly or in any combination.

The invention claimed is:

1. An apparatus for lengthening a vibrating length of strings on a harp, which apparatus comprises:

(i) a securing means for securing one end of the strings;

(ii) adjuster members for increasing the length of the strings in order to increase a tension in the strings and thereby alter a frequency of vibration of the strings;

(iii) a rod member;

and (iv) a mounting means for mounting the apparatus on the harp, and characterised in that:

(v) the adjuster members are lever members;

(vi) there is one of the lever members for each one of the strings;

(vii) the securing means comprises a plurality of finger members, in which there is one of the finger members for each one of the strings of the harp, and in which each finger member is operated by one of the lever members;

(viii) the lever members have a cam portion which operates the securing means;

(ix) the lever members have a receiving slot for receiving the rod member;

(x) the lever members being pivotably mounted on the rod member;

and whereby:

(xi) the lever members are pivotable adjuster members which are pivotable between a string non-lengthening position and a string lengthening position;

(xii) the lever members act on the securing means in order to increase the length of the string.

2. The apparatus according to claim 1 in which, in use, the string non-lengthening position is one in which a respective string vibrates at a non-adjusted frequency on the harp, and in which the string lengthening position is one in which the respective string is increased in length to increase tension in the respective string and thereby increase the frequency.

3. The apparatus according to claim 1 in which securing locations are all in a straight line, and in which the adjuster members are of different shapes, with the different shapes increasing the length of the strings by different amounts.

4. The apparatus according to claim 1 in which securing locations are holes.

5. The apparatus according to claim 1 in which the securing means is a securing plate.

6. The apparatus according to claim 5 in which the mounting means comprises a pair of apertured lugs arranged one at each end of the apparatus.

7. The apparatus according to claim 6 in which the lugs are formed as an integral part of the securing plate.

8. The apparatus according to claim 1 and including a fine tuning means.

9. The apparatus according to claim 8 in which the fine tuning means is a screw which in use locates in a frame of the harp, and which has a head for abutting against the adjuster members in order to provide fine tuning of the adjuster members.

10. A harp when provided with the apparatus according to claim 1.

* * * * *